No. 693,176. Patented Feb. 11, 1902.
J. P. SNEDDON.
WROUGHT IRON HEADER.
(Application filed Apr. 12, 1901.)
(No Model.)

Witnesses.
Fred D. Sweet

Inventor:
James P. Sneddon
By Kay & Totten
Attorneys.

UNITED STATES PATENT OFFICE.

JAMES P. SNEDDON, OF BARBERTON, OHIO, ASSIGNOR, BY MESNE ASSIGNMENTS, TO THE STIRLING COMPANY, OF JERSEY CITY, NEW JERSEY, A CORPORATION OF NEW JERSEY.

WROUGHT-IRON HEADER.

SPECIFICATION forming part of Letters Patent No. 693,176, dated February 11, 1902.

Application filed April 12, 1901. Serial No. 55,544. (No model.)

*To all whom it may concern:*

Be it known that I, JAMES P. SNEDDON, a resident of Barberton, in the county of Summit and State of Ohio, have invented a new and useful Improvement in Wrought-Metal Headers; and I do hereby declare the following to be a full, clear, and exact description thereof.

My invention relates to a boiler-header for Niclausse and similar boilers; and its object is to provide a header for such boilers made of wrought metal.

In the Niclausse boiler the water-tubes comprise an outer water-tube and an inner circulating-tube, both connected to the same header, thereby necessitating a longitudinal diaphragm in said header, which forms, in effect, two chambers or passages therein, with one of which the outer water-tubes communicate and with the other of which the inner circulating-tubes communicate, the object of said diaphragm being to separate the two currents of circulation, or the "uptake" and "downtake," as they are called, in said header. Each header is constructed to connect a vertical row or tier of tubes, and as these tubes are arranged in staggered relation it necessitates what is called a "serpentine" form of header. By reason of the irregular shape of these headers and with the diaphragm therein it has never before my invention been possible to construct the same of wrought metal, by reason of the difficulties experienced in properly supporting the tube interiorly and the diaphragm therein while shaping the same. I have, however, devised a practical method of an apparatus for making these headers of wrought metal, as described and claimed in my applications of even date herewith, Serial Nos. 55,542 and 55,543. As I believe I am the first to construct such headers provided with a diaphragm of wrought metal, I desire to claim the same herein.

My invention also comprises such a header provided with an integral cone which seats itself in the opening in the steam and water drum.

Figure 1:
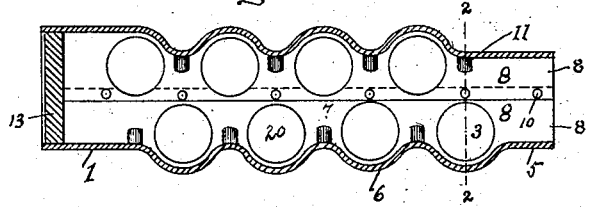
Figure 2:
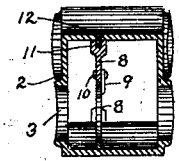
Figure 3:
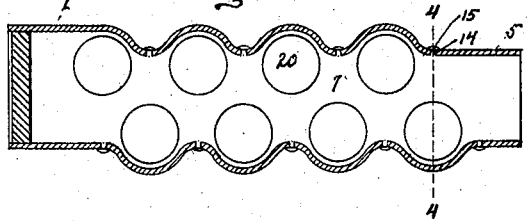
Figure 4:
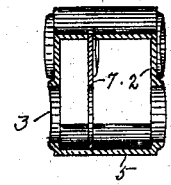
Figure 5:
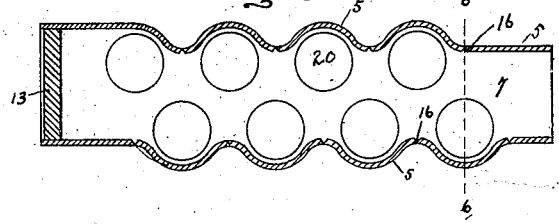
Figure 6:
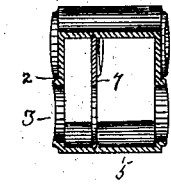
Figure 7:
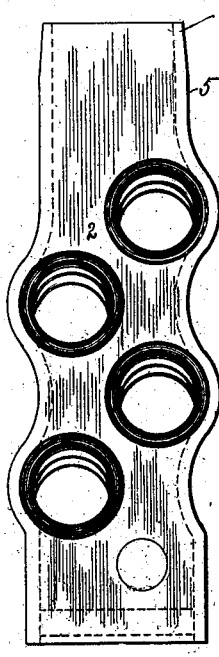

In the accompanying drawings, Figure 1 is a longitudinal vertical section of one form of my header. Fig. 2 is a transverse section of the same on the line 2 2. Fig. 3 is a vertical longitudinal section of another form of my header. Fig. 4 is a transverse section of the same on the line 4 4. Fig. 5 is a vertical longitudinal section of still another form of header. Fig. 6 is a transverse section of the same on the line 6 6. Fig. 7 is a side view, and Fig. 8 a longitudinal sectional view, of the header provided with the integral cone.

My header comprises a serpentine body 1, rectangular in cross-section and having substantially flat side walls 2 2, which are provided with the openings 3 for receiving the tubes of the boiler, the metal around said openings being turned out or flanged, as at 4. The other two walls 5 of the header are formed sinuous or corrugated, as at 6 6, the corrugations on the two opposite sides alternating, so as to give to said header in side view a substantial serpentine form. 7 represents the diaphragm, which extends longitudinally through the header and is connected to the sinuous or corrugated walls 5 thereof. This diaphragm may be placed in the header after the latter is formed, and inasmuch as the diaphragm must also be serpentine in shape it is necessary to form it in two sections 8 8, as shown in Fig. 2, one of which sections is provided with the offset portion 9, to which the edge of the other section is connected, as by means of rivets 10. The edges of these sections are provided at intervals with the enlargements 11, which are provided with suitable threaded openings for receiving the short tap-screws 12, which pass through threaded openings in the walls 5 of the header and then into the threaded openings in the enlargements 11. In this form of header the body 1 is first shaped into serpentine form from a squared tube, as described in my application, Serial No. 55,541, of even date herewith, and then the two sections 8 of the diaphragm are placed therein and said sections united by means of the rivets 10, after which the screws 12 are put in place, thereby securing said diaphragm in the header. One end of the header is then closed by means of the end piece 13, which is welded therein.

The header shown in Figs. 3 and 4 has its body 1 of the same shape as that shown in Fig. 1, the only difference being in the construction of the diaphragm 7, the same being composed of a single integral piece, which is first formed to shape and then held in position in the header while the walls of the latter are pressed down into the corrugations of the edges of the diaphragm, the said edges being provided on their concave portions with the projections or teats 14, which are caused to penetrate the walls of the header and be upset on the outside thereof, as at 15, whereby the diaphragm with these penetrating and upset portions forms substantially a tie between the walls of the header and strengthens the same against high internal pressure. The header shown in Figs. 5 and 6 is the same as that shown in Figs. 3 and 4, except that the projections 16 on the edges of the diaphragm are not long enough to penetrate the walls of the header, but merely embed themselves therein. It is also possible to secure this diaphragm in place without any such edge projections, for the reason that in forming the body of the header the tube is heated before the diaphragm is placed within the same and is then pressed onto the edges of the diaphragm, this pressing causing the edges of the latter to embed themselves slightly in the metal of the walls of the tube, whereby it will be held securely in place.

Figure 8:
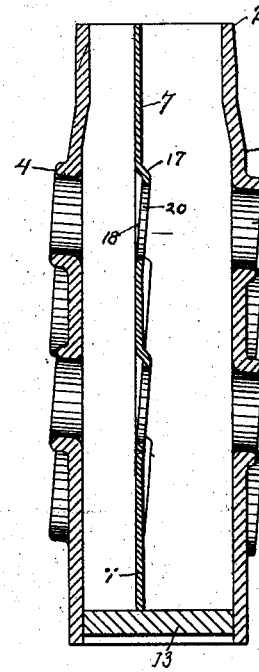

It will be observed that the holes 3 on the opposite sides of the header are one slightly higher than the other, as shown clearly in Fig. 8. This is for the purpose of accommodating the header to the water-tubes, which in the Niclausse and similar boilers are inclined downward toward their rear ends. The corrugations 6 on the walls of the header do not run straight across, but are oblique in order to accommodate themselves to the inclined tubes of the boiler. So, too, the diaphragm 7 is jogged or stepped, as at 17, to form the faces 18 at right angles to the axis of the water-tubes, in which faces are formed openings 20, through which the inner circulating-tubes pass, as will be readily understood. Of course it will be understood that if the header is intended for a boiler having horizontal tubes the openings 3 will be directly opposite each other, and the corrugations 6 will run straight across the faces of the header, while the diaphragm 7 will be plain or flat.

The headers in the usual boiler constructions communicate at their upper ends with an elevated steam and water drum, and the usual custom has been to provide the upper ends of the headers with a conical seat and provide a similar seat in the elevated drum. A double-cone bushing of a less angle than the conical seats was then placed between the two, said bushing having one end seated against the conical seat in the elevated drum and the other end seated in the conical seat against the upper end of the header. This necessitated two joints; but my improved header is provided with the cone 21, which is integral with the said header and which is provided with a square end which seats itself against the conical seat, of a greater angle, in the drum, as will be readily understood, thereby dispensing with one of the joints and reducing liability of leakage to that extent.

My improved header is made entirely of wrought metal and is much stronger and lighter than the header ordinarily used in this class of boilers. Furthermore, the diaphragm when secured in the manner shown in Figs. 1 to 4 serves not only the purpose of separating the two currents of circulation in said header, but also serves as a tie between the walls of the header, thereby strengthening the same against high internal pressure.

What I claim, and desire to secure by Letters Patent, is—

1. A wrought-metal boiler-header of serpentine form provided with a longitudinal diaphragm secured to the corrugated walls of said header.

2. A wrought-metal boiler-header of serpentine form, the corrugations thereon extending at an angle across the face thereof, and a longitudinal diaphragm in said header secured to the corrugated walls thereof.

3. A wrought-metal boiler-header provided with a diaphragm having its edges seated in the metal composing the walls of said header.

4. A wrought-metal boiler-header provided with a diaphragm having edge projections which are embedded in the walls of the header.

5. A wrought-metal boiler-header of serpentine form provided with a longitudinal diaphragm having edge projections on the concave portions of its edges, which projections are embedded in the walls of the header.

6. A wrought-metal boiler-header provided with a longitudinal diaphragm secured to opposite side walls of said header and forming a tie between said walls.

7. A wrought-metal boiler-header provided with a longitudinal diaphragm having edge projections which extend through said walls and are upset on the outside thereof.

8. A wrought-metal boiler-header of serpentine form provided with a longitudinal diaphragm secured to the corrugated walls thereof, and with an integral cone at one end.

In testimony whereof I, the said JAMES P. SNEDDON, have hereunto set my hand.

JAS. P. SNEDDON.

Witnesses:
O. D. EVERHARD,
E. E. BAKER.